United States Patent [19]

Indra et al.

[11] Patent Number: 4,763,622
[45] Date of Patent: Aug. 16, 1988

[54] INTERNAL COMBUSTION ENGINE OF THE SPARK IGNITION TYPE

[75] Inventors: Friedrich Indra, Zwingenberg; Manfred Tholl, Mainz, both of Fed. Rep. of Germany

[73] Assignee: General Motors Corporation, Detroit, Mich.

[21] Appl. No.: 3,725

[22] Filed: Jan. 16, 1987

[30] Foreign Application Priority Data

Jan. 20, 1986 [GB] United Kingdom ............... 3601458

[51] Int. Cl.⁴ .......................................... F02B 23/08
[52] U.S. Cl. .................... 123/308; 123/661; 123/671
[58] Field of Search ............... 73/116; 123/308, 432, 123/661, 671

[56] References Cited

U.S. PATENT DOCUMENTS

| | | |
|---|---|---|
| 2,428,886 | 10/1947 | MacPherson . |
| 2,810,377 | 10/1957 | Weissenbach . |
| 2,826,185 | 3/1958 | Keydel et al. ............... 123/671 |
| 3,045,655 | 7/1962 | Formia ........................ 123/308 |
| 4,271,803 | 6/1981 | Nakanishi et al. ........... 123/432 |
| 4,510,794 | 4/1985 | Couch .......................... 73/116 |

FOREIGN PATENT DOCUMENTS

| | | |
|---|---|---|
| 2624050 | 12/1977 | Fed. Rep. of Germany . |
| 3152196 | 8/1982 | Fed. Rep. of Germany . |
| 3347112 | 7/1984 | Fed. Rep. of Germany . |
| 193717 | 11/1982 | Japan ............... 123/661 |
| 23220 | 2/1983 | Japan ............... 123/308 |
| 99026 | 6/1984 | Japan ............... 123/308 |
| 203818 | 11/1984 | Japan ............... 123/661 |
| 60215 | 4/1985 | Japan ............... 123/661 |
| 700364 | 12/1953 | United Kingdom ........ 123/308 |
| 1151561 | 5/1969 | United Kingdom ........ 123/308 |

Primary Examiner—Michael Koczo
Attorney, Agent, or Firm—Robert J. Outland

[57] ABSTRACT

In an internal combustion engine having two intake valves on one side and two exhaust valves on the other side of each cylinder, all four valves are displaced towards the exhaust valve side to provide room for a squish zone on the intake valve side. The squish zone is formed in such a way that the mixture is directed or "squished" in the direction of the spark plug to provide turbulence for improving combustion, especially during partial load operation.

13 Claims, 1 Drawing Sheet

INTERNAL COMBUSTION ENGINE OF THE SPARK IGNITION TYPE

This invention relates to internal combustion engines of the spark ignition type, including a cylinder closed by a cylinder head with two intake and two exhaust valves, a piston arranged in the cylinder and a compression or squish zone between the piston and the cylinder head. An internal combustion engine of this type has been disclosed in the German Offenlegungsschrift DE OS No. 33 47 112.

The above-mentioned DE OS No. 33 47 112 illustrates in FIGS. 7 and 8 an internal combustion engine wherein a cylinder is closed by a cylinder head, on one side of which there is provided a combustion chamber recess into which extend an intake valve and an exhaust valve. A further intake valve and an exhaust valve extend into a squish zone which is arranged adjacent to the combustion chmaber recess. The squish zone includes a squish crevice or compression clearance which is oriented transversely to the cylinder and generally normal to its axis, not shown. The intake valve which extends directly into the combustion chamber controls a partial-load intake conduit. The mixture is caused to enter into the cylinder through this intake conduit or port tangentially so as to create a swirl flow in the cylinder. During partial-load operation, a full-load intake conduit, which extends to the other intake valve, is kept closed by means of an additional valve. It is only during full-load operation that this valve is caused to move into the open position, so that the mixture is permitted to enter into the cylinder without any swirl flow formation. The reason for this arrangement is to limit the combustion velocity of the mixture during full-load operation and to thereby reduce the generation of noise.

Some of the more important objectives in recent times have been to reduce the amounts of objectionable substances in exhaust gases, especially those of internal combustion engines, and to reduce fuel consumption. In an effort to achieve such objectives, German Offenlegungsschrift DE OS No. 26 24 050 discloses an arrangement in which the fuel mixture enters the combustion chamber from a squish crevice which extends obliquely in a direction towards a spark plug. The combustion chamber disclosed in this publication is provided, in the region of the spark plug, with a rounded peripheral surface which causes the mixture directed towards the spark plug to be redirected. Furthermore, an additional squish crevice is provided which is arranged opposite the obliquely extending squish crevice and is oriented transversely to the cylinder. This additional squish crevice will cause a cross flow and generate a turbulence in the mixture which will result in improved combustion. However, the above-mentioned Offenlegungsschrift relates to an internal combustion engine having only two valves per cylinder.

In the case of internal combustion engines with four valves, the combustion chamber surface has heretofore been provided with as much valve surface as is possible so that gas exchange can proceed in a rapid manner. However, if the valves are to cover a large surface area of the combustion chamber, little room will be left for squish surfaces, so that the benefits of significant squish effects cannot be realized. As a result, combustion in the lower partial-load levels will be incomplete, and the portion of objectionable substances contained in the exhaust gas will be relatively high. However, if the engine is to be run with a lean mixture, it is essential that there be provided adequate mixture movement in the combustion chamber, and this can be accomplished with the above-mentioned compression or squish surfaces.

It is also apparent from the German Offenlegungsschrift DE OS No. 31 52 196 that it is known in the art that mixture turbulence can be improved if the combustion chamber has a gable roof type configuration. However, this approach by itself does not help in providing adequate space for the squish surfaces.

It is an object of the invention to provide a spark ignition combustion engine of the type described above in which the objective of promoting optimum mixture formation can be realized in a relatively simple manner so that combustion is essentially complete in all load ranges.

In accordance with the invention, this object is met by providing that the grouped intake and exhuast valves are offset, relative to the axis of the cylinder, in the direction towards the exhaust valve side, and in arranging that a squish zone is formed on the intake valve side of the cylinder by a squish surface provided on the cylinder head and a corresponding squish surface provided on the piston, and in that, furthermore, the squish zone has a squish crevice which extends towards the spark plug.

Placing the valve group off-center provides in an engine having four valves the necessary space for a squish zone to be located outside the area of the valve ports. Obviously, this requires that the effective surface area of the valves must be somewhat smaller than is usual with prior-art four-valve type engines, which constitutes a reversal of the design principle applied in the past. However, the inventor has found that the advantage of providing an enlarged squish zone with a squish crevice which is directed toward the spark plug, more than compensates for the disadvantage of under-utilizing the available valve surface area.

In accordance with another advantageous feature of the present invention, the inner side of the cylinder head has a gable roof type configuration, and the ridge of the gable extends between the respective intake and exhaust valves.

The squish surfaces on the piston top and the inner side of the cylinder head can be machined in a relatively simple manner if the shape of that surface area corresponds to the shape of a section of a cone surface.

In accordance with another advantageous feature of the invention, the inner edges of the respective squish surfaces are indented into the area between the intake valves in the direction towards the spark plug. This arrangement will provide that, near the end of the piston compression stroke, an intensive mixture squish flow is directed towards the spark plug so that the combustion is intensive and proceeds rapidly and reliably. By providing rapid combustion, one is able to delay the spark and to thereby increase engine efficiency and reduce the objectionable substances in the exhaust gase. Because the spark plug receives a combustion-ready mixture, combustion is very reliable, and this design concept therefore contributes towards the goal of obtaining complete combustion.

According to another design feature which contributes towards obtaining the same goal, an auxiliary squish area is provided on the exhaust valve side of the cylinder. This additional squish area is smaller than the oppositely located squish zone and has a squish crevice which extends transversely, or normal, to the cylinder axis. Owing to this arrangement, the two mixture currents interact in such a manner that a barrel-like whirl effect is produced below the spark plug in the region of the ridge of the combustion chamber. By virtue of this whirl effect, the flame front is caused to spread out in the cylinder from the spark plug in a uniform, broad and rapid fashion, so that the objective of promoting optimum combustion is attained.

According to another advantageous feature of the invention, which is also instrumental in assisting the combustion process, the thickness of the squish crevice is constant over the entire area of the squish zone.

According to a further advantageous feature of the invention, an ion probe may be arranged between the exhaust valves. The provision of an ion probe will enable one to monitor the combustion process and to control the engine with respect to ignition timing and mixture ratio.

It should be appreciated that a variety of arrangements may be utilized in the practice of the invention. To convey the concept of the invention, one exemplary embodiment is illustrated schematically in the drawing and described in the following specifications.

Figure 1:
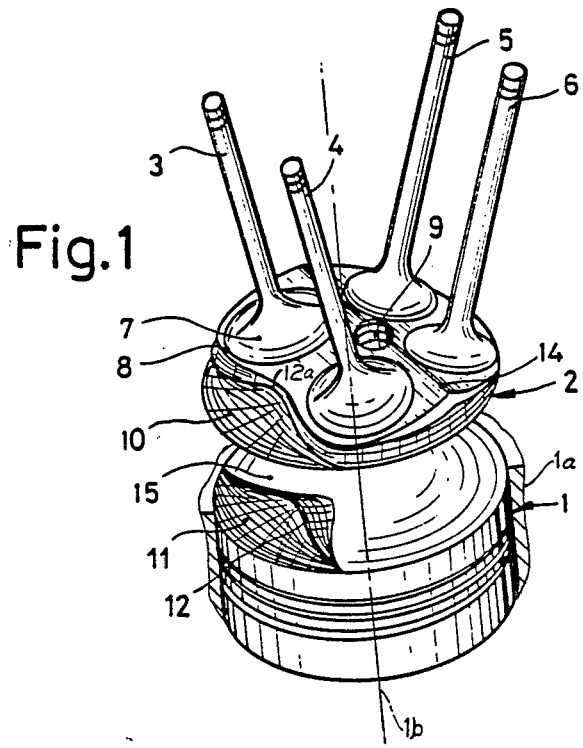
FIG. 1 is a perspective view of the cylinder defining end wall surface of a cylinder head with two intake and two exhaust valves, as well as an associated cylinder and piston of an internal combustion engine according to the invention.

Referring now to the drawing in detail, Figure 1 illustrates a piston 1, reciprocable in a cylinder 1a and having an axis 1b, as well as the cylinder end wall defining surface of a cylinder head 2 of an internal combustion engine. To gain a better understanding of the spatial configuration, contour lines have been inserted into the essential areas. The cylinder head 2 has two intake valves 3,4 and two exhaust valves 5,6, i.e. the engine is of the type having four valves per cylinder. All valves have circular valve heads 7 which, when the valves are in their closed positions, are in sealing engagement with respective valve seats 8. Valve heads of this type can be easily manufactured on a lathe. As is usual, the valves are also able to rotate during engine operation. This will ensure uniform wear and proper sealing. The intake valves 3,4 are larger than the exhaust valve so as to compensate for the pressure differences.

Valves 3-6 have arranged centrally therebetween a spark plug 9. An essential feature embodied in the invention is that the entire group of valves, which is comprised of valves 3,4,5 and 6 and which resembles a four-blade clover leaf, is located, with respect to piston 1 and cylinder axis 1b, off-center and offset towards the side of the exhaust valves 5,6. The reason for offsetting the group of all four valves toward the exhaust valve side of the cylinder is to gain space on the intake valve side that can be utilized for a squish surface 10. The piston 1 has a corresponding squish surface 11. The configuration of each of the squish surfaces 10,11 is such that a squish zone 15 is created therebetween. The squish crevice of the squish zone is shaped so as to provide that during the operation of the engine, the mixture is squirted or squished in the direction of spark plug 9. The configuration of the squish surfaces 10,11 corresponds to sections of a cone surface, and the inner edges 12, 12a of the squish surfaces, rather than extending linearly, are indented, or extended, into the area between the intake valves 3,4 in the direction towards the exhaust valve area. This enlarges the squish surface area.

Figure 2:
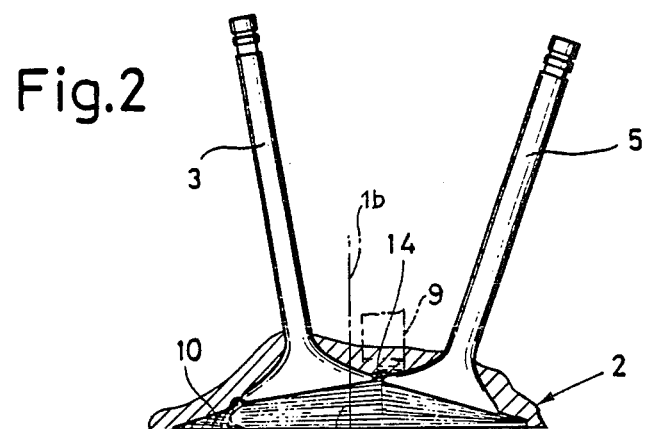
FIG. 2 is a longitudinal section through a portion of the cylinder head according to FIG. 1.
Figure 3:
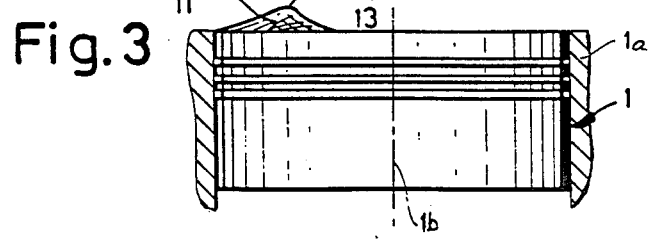
FIG. 3 is a side view of the cylinder and piston according to FIG. 1.

FIG. 2 illustrates the configuration of a combustion chamber 13 inside of the cylinder head 2. It is apparent from this figure that the shape of this combustion chamber corresponds to the shape of a gable roof, with the ridge 14 offset toward the exhaust valve side from the cylinder axis 1b and extending between the intake valve 3 and exhaust valve 5 as well as between the intake valve 4 and exhaust valve 6. One will also note in FIG. 2 the squish surface 10. In FIG. 3, which is an illustration of cylinder 1a having axis 1b and carrying piston 1, one will note the corresponding piston squish surface 11.

Figure 4:
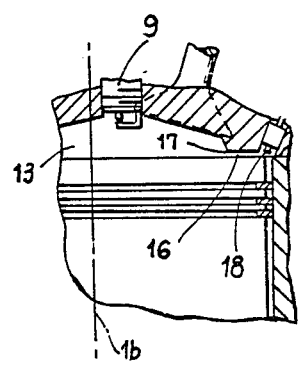
FIG. 4 is a cross-sectional view of an engine assembly including optional features in accordance with the invention.

An optional feature embodied in the invention and illustrated in FIG. 4 of the drawing is that there may be provided on the side of the exhaust valves 5,6 an auxiliary squish area 16. This auxiliary squish area is smaller than the squish zoner 15 provided on the intake valve side and has an edge 17 which extends normal to the axis 1b across the end of piston 1. The interaction of the quench flows will generate a barrel-type whirl effect which is conducive to the combustion process.

Another optional feature illustrated in FIG. 4 of the drawings is an ion probe 18 which may be arranged between the exhaust valves 5,6 at the edge of the cylinder. The ion probe may be used to monitor the combustion process in the combustion chamber 13.

What is claimed is:

1. A spark ignition internal combustion engine having a cylinder head with an inner surface defining one end of a cylinder containing a piston reciprocable therein and having a common axis, said inner surface having in part the form of a gable roof with a ridge line between opposite sides, a spark plug extending through the inner surface along the ridge line and a pair of intake valves and a pair of exhaust valves respectively seatable on the inner surface on opposite sides of and outwardly from the ridge line, the valves being spaced closely around the spark plug, wherein the ridge line of the roof portion, the spark plug and the associated valves are offset relative to the axis toward one side of the cylinder in the direction of the exhaust valves to provide an enlarged portion of the inner surface lying between the intake valves and the side of the cylinder outward thereof relative to the ridge line, a squish surface being formed on said enlarged portion of the inner surface and sloping upward toward the spark plug from an edge of the cylinder to an area adjacent the intake valves, and the piston opposes the cylinder head inner surface and includes a raised portion having a squish surface opposing and being substantially coextensive with the cylinder head squish surface and having a similar slope upwardly from an outer edge of the piston, the piston squish surface being positioned to closely approach the cylinder head squish surface during engine operation to momentarily create a small volume squish zone from which part of each cylinder charge is forced rapidly inward toward the spark plug to create combustion assisting turbulence.

2. An internal combustion engine according to claim 1 wherein the squish surfaces are formed by sections of the lateral surface area of a cone.

3. An internal combustion engine according to claim 2, wherein the squish surfaces have inner edges relative to the cylinder edge which extend between the intake valves in the direction towards the spark plug.

4. An internal combustion engine according to claim 1 wherein an auxiliary squish area is provided outward of the exhaust valves relative to the ridge line and opposite the squish zone by a depending portion of the cylinder head defining an auxiliary squish surface that is closely approached by the piston during operation, the squish area being smaller than the squish zone and forming a squish volume that extends generally normal to the cylinder and piston axis.

5. An internal combustion engine according to claim 1 wherein the thickness of the squish zone is uniform over its entire area.

6. An internal combustion engine comprising a piston movable within a cylinder having an axis and a closed end shaped in part like a gable roof having a ridge line with a pair of intake valves on one side, a pair of exhaust valves on the opposite side and a spark plug between the intake and exhaust valves wherein the valves are offset from the axis toward the exhaust valve side and a squish zone is formed outward of the intake valves relative to the ridge line by opposing squish surfaces of the piston and the cylinder closed end that, when closely approaching, define a squish crevice extending inwardly from an edge of the cylinder toward the spark plug at an angle off normal to the axis and generally along the roof shaped cylinder end.

7. An engine as in claim 6 wherein the squish surfaces are formed as conical sections.

8. An engine as in claim 7 wherein the squish surfaces have inner edges relative to the cylinder edge which protrude between the intake valves in the direction towards the spark plug.

9. An engine as in claim 6 wherein an auxiliary squish area is provided outward of the exhaust valves relative to the ridge line and opposite the squish zone by a depending portion of the cylinder head defining an auxiliary squish surface that is closely approached by the piston during operation, the squish area being smaller than the squish zone and forming an auxiliary squish crevice that extends generally normal to the cylinder and piston axis.

10. An engine as in claim 6 wherein the thickness of the squish crevice is uniform over the entire area of the squish zone.

11. An engine as in claim 7 wherein the piston squish surface is formed on a portion protruding from a generally flat top.

12. An engine as in claim 8 wherein the squish zone forming piston squish surface is disposed on a portion protruding from a generally flat top and an auxiliary squish area is provided outward of the exhaust valves relative to the ridge line and opposite the squish zone, the squish area being smaller than the squish zone and defined by auxiliary squish surfaces of the cylinder end and piston formed in part by a protruding portion of the cylinder end closely opposing the generally flat top of the piston and forming an auxiliary squish crevice extending generally normal to the piston and cylinder axis.

13. An engine as in claim 12 wherein the thicknesses of the squish crevices are uniform over the entire areas of the squish zone and auxiliary squish area.

* * * * *